Sept. 12, 1939.    W. B. WELLS ET AL    2,172,724
LIGHT SIGNAL
Filed July 3, 1936    6 Sheets-Sheet 1

Fig.1.

INVENTORS
Wesley B. Wells and
William K. Lockhart
BY
THEIR ATTORNEY

Sept. 12, 1939.  W. B. WELLS ET AL  2,172,724
LIGHT SIGNAL
Filed July 3, 1936  6 Sheets-Sheet 4

Fig. 4.

INVENTORS
Wesley B. Wells and
William K. Lockhart.
BY
THEIR ATTORNEY

Sept. 12, 1939.  W. B. WELLS ET AL  2,172,724
LIGHT SIGNAL
Filed July 3, 1936  6 Sheets-Sheet 5

INVENTORS
Wesley B. Wells and
William H. Lockhart
BY
THEIR ATTORNEY

Sept. 12, 1939.                    W. B. WELLS ET AL                    2,172,724
                                      LIGHT SIGNAL
                                   Filed July 3, 1936                6 Sheets-Sheet 6

INVENTORS
Wesley B. Wells and
William K. Lockhart.
THEIR ATTORNEY

Patented Sept. 12, 1939

2,172,724

UNITED STATES PATENT OFFICE 2,172,724

LIGHT SIGNAL

Wesley B. Wells, Wilkinsburg, and William K. Lockhart, Penn Township, Allegheny County, Pa., assignors to The Union Switch & Signal Company, Swissvale, Pa., a corporation of Pennsylvania Application July 3, 1936, Serial No. 88,768

5 Claims. (Cl. 177—329)

Our invention relates to light signals, and particularly to light signals which are capable of selectively projecting a plurality of beams of light of different colors from a single light source.

We will describe one form of light signals embodying our invention, and will then point out the novel features thereof in claims.

In the accompanying drawings.

Similar reference characters refer to similar parts in each of the several views.

Figure 1:
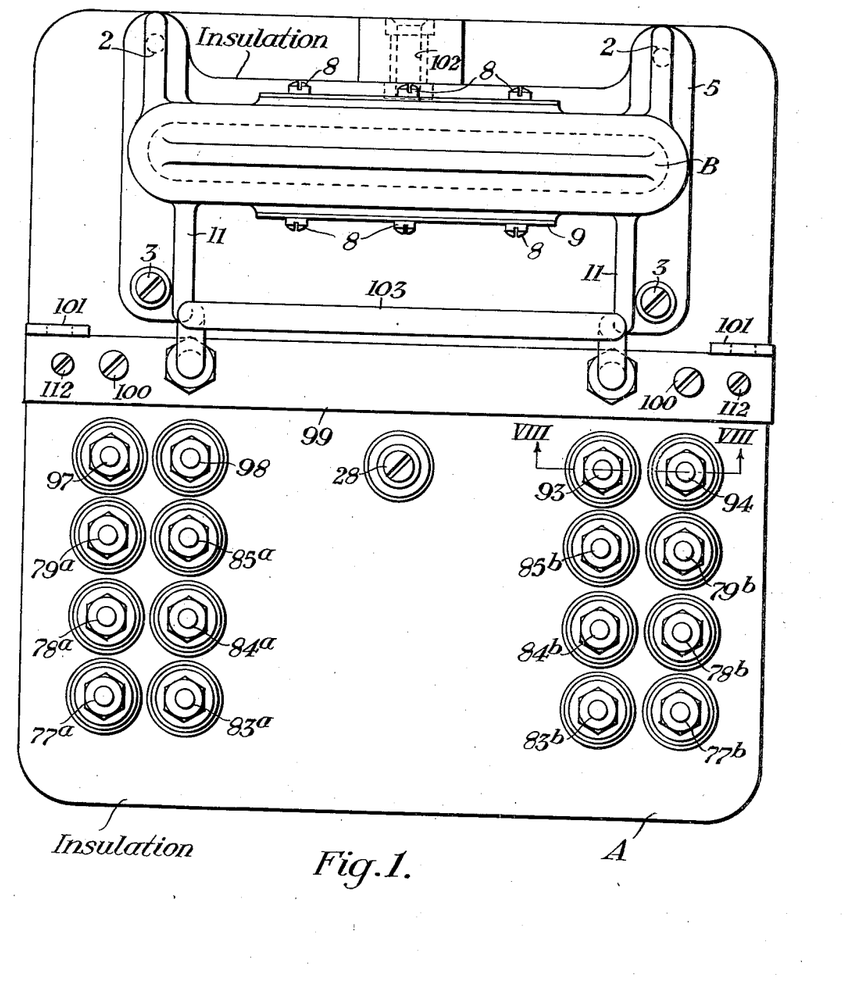
Fig. 1 is a top plan view showing one form of light signal embodying our invention.
Figure 2:
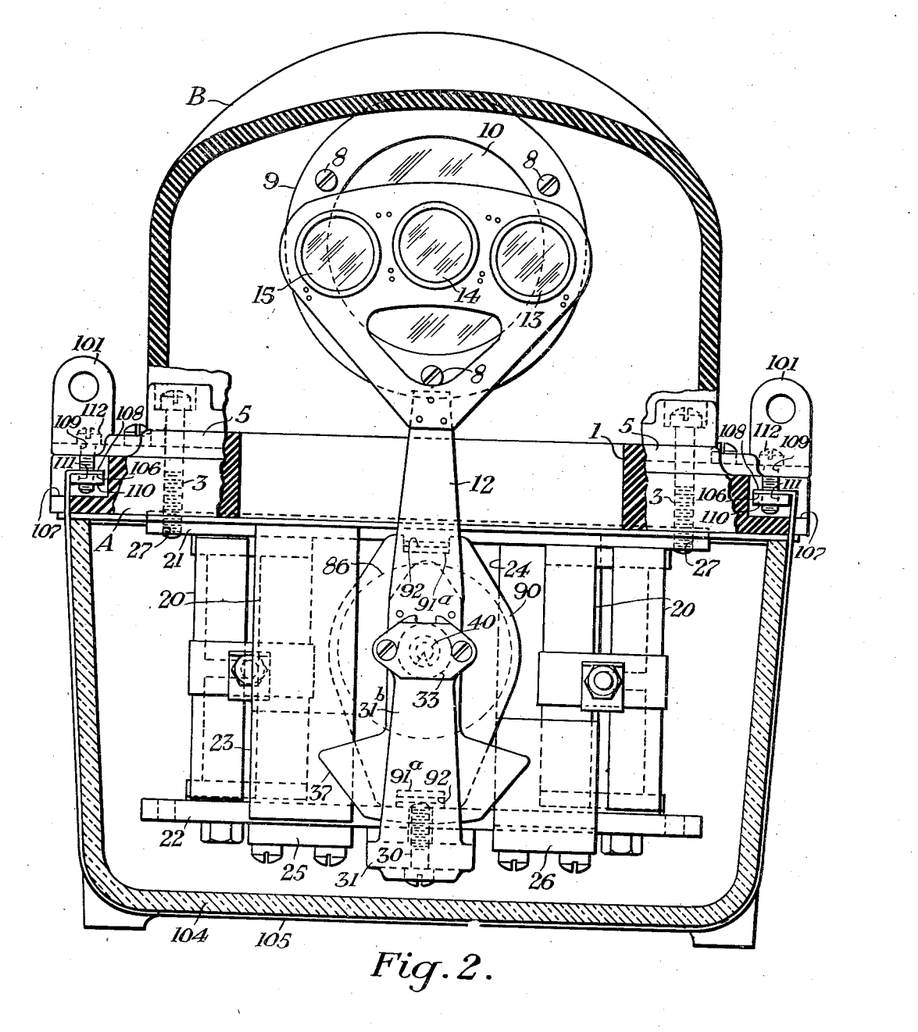
Fig. 2 is a front view of the signal illustrated in Fig. 1 with the glass cover which encloses the operating mechanism and certain of the other parts shown in section to better illustrate the construction of the operating mechanism.
Figure 3:
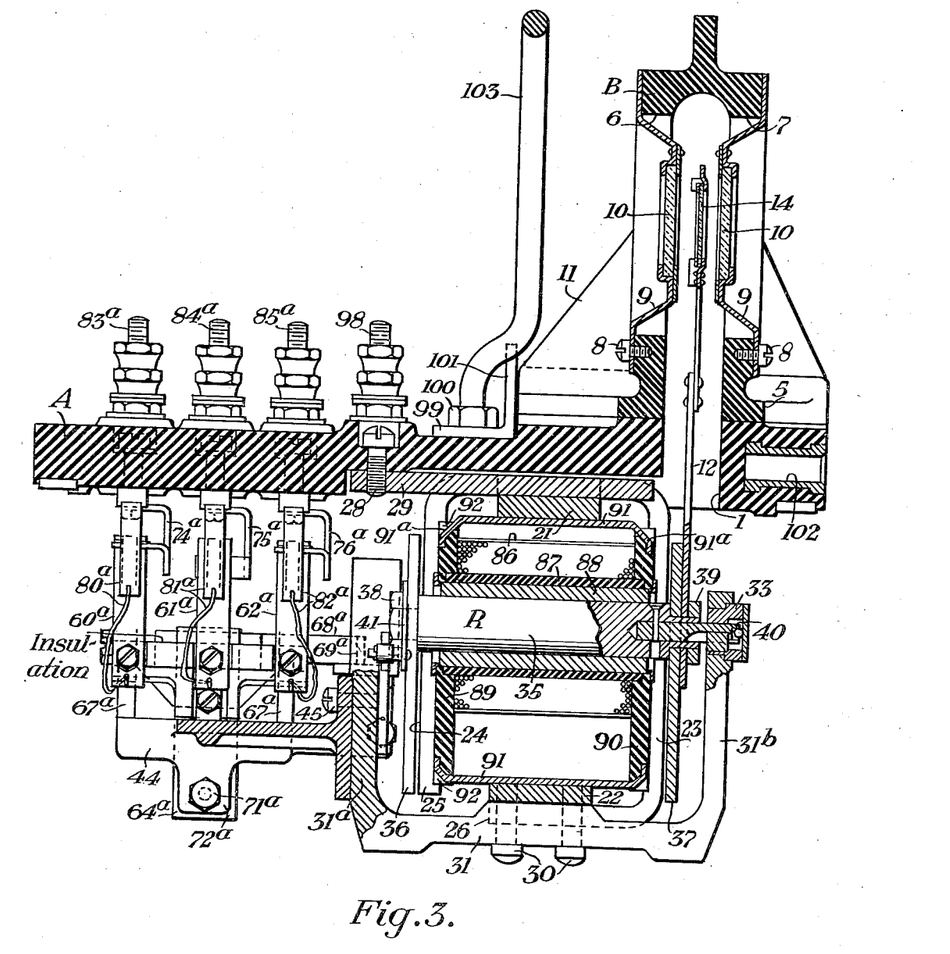
Fig. 3 is a view partly in section and partly in elevation of the signal shown in Figs. 1 and 2.

Referring first to Figs. 1 to 4, inclusive, the signal comprises a suitable top plate A of insulating material, which top plate serves as a support for the operating and contact mechanisms of the signal. Formed in the top plate A adjacent the right-hand end thereof as viewed in Fig. 3 is a transversely extending rectangular slot 1, and secured to the upper side of the top plate in vertical alignment with this slot, by means of machine screws 2 and 3 is a casing B, which casing, in the form here shown, is substantially semicylindrical in shape. The screws 2 each extend upwardly through clearance holes in the top plate and are screwed into tapped inserts which are molded in a flange 5 that is formed on the bottom of the casing B, while the screws 3 each extend downwardly through clearance holes in the flange 5 and are screwed into threaded holes 27 formed in the backstrap 21 which comprises a part of the operating mechanism of the relay, as will appear more fully hereinafter. The front and rear walls of the casing B are provided with aligned circular openings 6 and 7, and secured to this casing adjacent the outer sides of these openings by means of machine screws 8 are ring members 9 which carry aligned circular windows 10 of transparent glass. The ring members 9 are similar, and are preferably constructed of pressed steel to decrease their cost of manufacture. The screws 8 which fasten the ring members to the casing pass through clearance holes in the ring members, and are screwed into tapped inserts which are molded in the casing. The rear side of the casing, that is to say, the left-hand side as viewed in Fig. 3 is provided with triangular strengthening ribs 11, as will readily be seen by an inspection of the drawings.

Figure 4:
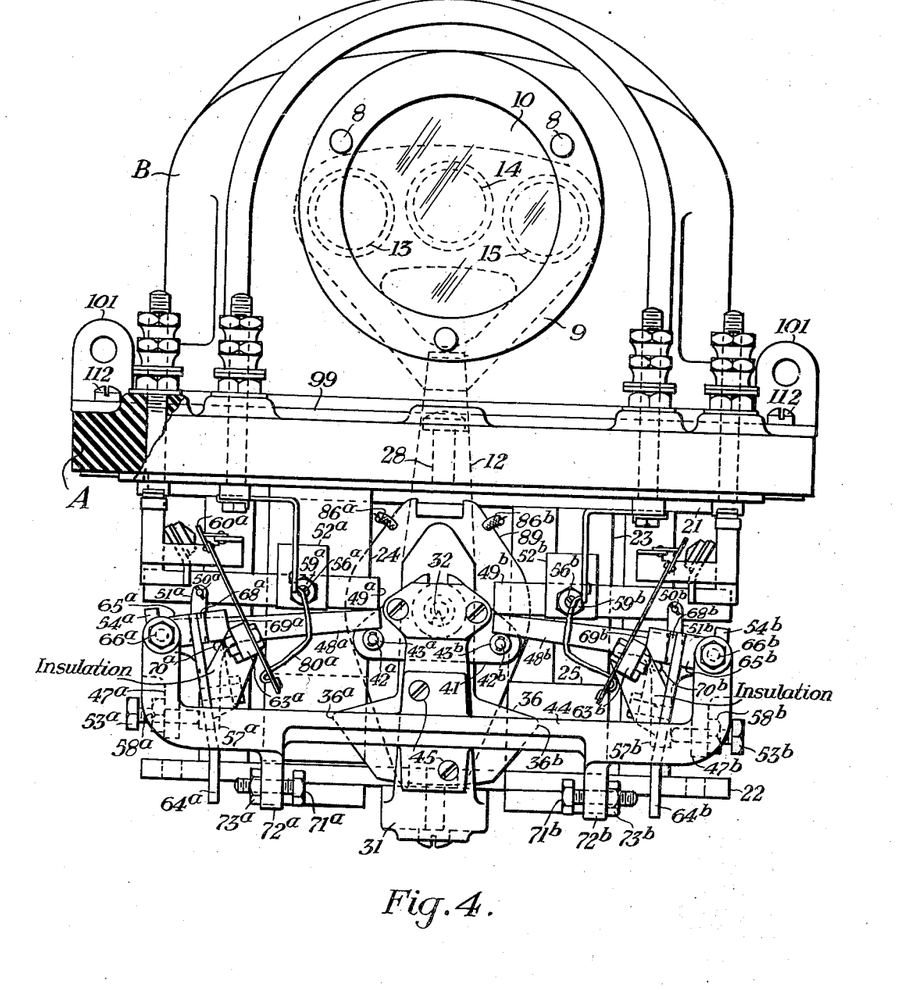
Fig. 4 is a rear elevational view with the cover removed of the signal shown in the preceding views.

Extending upwardly into the casing B through the slot 1 is a spectacle arm 12 which is provided at its upper end with three differently colored filters 13, 14, and 15, as best seen in Figs. 2 and 4. This arm is secured at its lower end to the operating mechanism of the signal in a manner which will appear hereinafter, and is capable of assuming a central or vertical position in which the filter 14 is located in axial alignment with the windows 10, a right-hand position, as viewed in Fig. 4 in which the filter 13 is located in axial alignment with the windows 10, and a left-hand position, as viewed in Fig. 4 in which the filter 15 is located in axial alignment with the windows 10. In utilizing the signal, the light rays from a suitable optical assembly forming no part of our present invention are caused to pass through the windows, and to converge at a focal point at or near the center of the filter which is then in axial alignment with the windows 10, and it will be apparent, therefore, that the light rays passing through the focal point will pass through one or the other of the filters, so that only rays of the color which are not filtered out can emerge from the signal. Since the filters are differently colored, it follows that the signal is capable of displaying three different aspects depending upon which of the filters is located in axial alignment with the windows 10. In the practical application of our signal to railway signaling, the spectacle arm 12 is biased to the vertical position and the filter 14 is colored red, so that when the arm occupies its vertical position, the projected beam is red, indicating "stop". The filter 15 is colored green so that when the arm 12 occupies its left-hand position, the beam emitted by the signal is green, indicating "proceed".

The filter 13 is colored yellow so that when the arm 12 occupies its right-hand position, the beam emitted by the signal is yellow, indicating "caution".

Figures 5, 6:
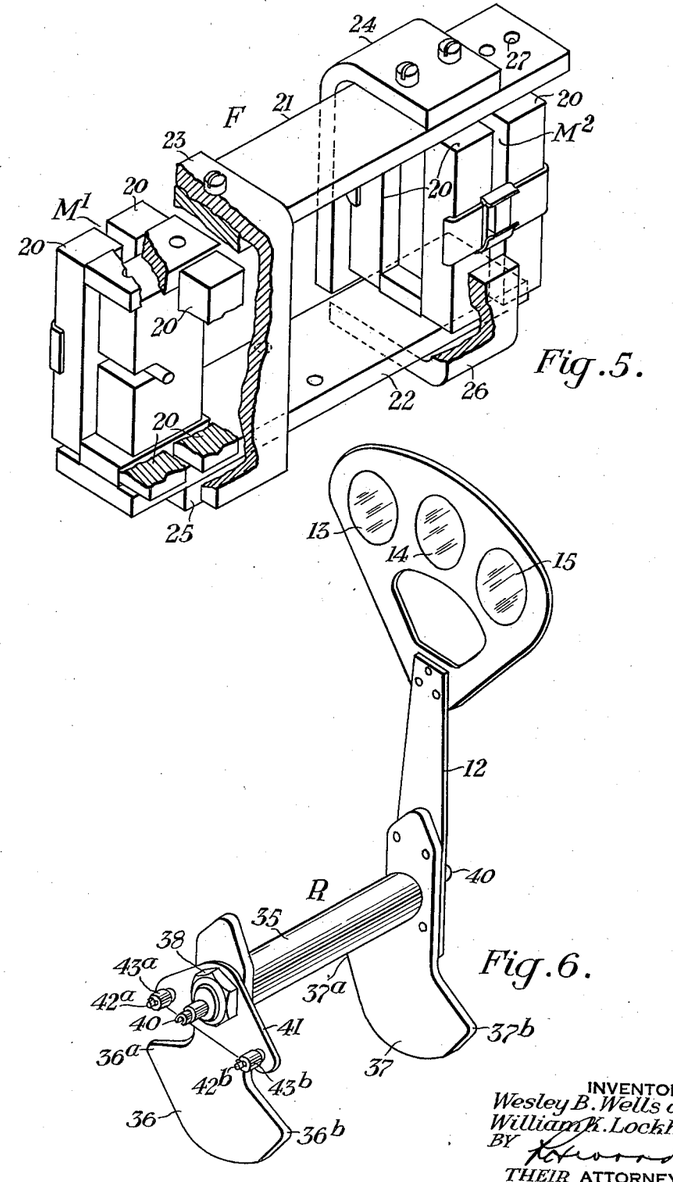
Fig. 5 is an isometric view of the field structure forming part of the operating mechanism for the signal in the preceding views, certain of the parts being broken away to better illustrate the construction.
Fig. 6 is an isometric view of the rotor forming part of the mechanism for the signal illustrated in Figs. 1 to 4, inclusive.

The operating mechanism for the signal is essentially the same as that described in U. S. Patent No. 2,133,603, dated Oct. 18, 1938, issued to Wesley B. Wells, one of the coinventors of the present invention, for Light signals. Briefly described, this mechanism comprises a field structure F which is best illustrated in Fig. 5, and a rotor R which is best illustrated in Fig. 6. Referring to Fig. 5, the field structure comprises two spaced magnets M¹ and M², each consisting of a plurality of permanently magnetized rectangular bars 20, the like poles of which are connected by magnetizable spaced parallel backstraps 21 and 22, respectively. The method of connecting the magnets with the backstraps, and the method of securing the backstraps together is fully described in the previously referred to Wells application, and need not, therefore, be repeated herein. Associated with the backstraps are four L-shaped pole pieces 23, 24, 25, and 26, two of which, 23 and 24, are secured to the upper backstrap 21, and the remaining two of which, 25 and 26, are secured to the lower backstrap 22. The pole pieces 23 and 24 are spaced apart, and are disposed with their vertical legs extending downwardly on opposite sides of the backstrap 21, and the pole pieces 25 and 26 are similarly spaced apart and are disposed with their vertical legs extending upwardly on opposite sides of the backstrap 22 directly opposite the downwardly extending legs of the pole pieces 23 and 24. It will be seen, therefore, that the field structure comprises four pole pieces, two of which, 23 and 25, are located on one side of and adjacent the opposite ends of the backstraps 21 and 22, and the other two of which, 24 and 26, are located on the other side of and adjacent the opposite ends of the backstraps 21 and 22. It will also be apparent that the pole pieces 23 and 24 will be of one polarity, while the pole pieces 25 and 26 will be of the opposite polarity. For example, if the bars 20 are disposed with their north magnetic poles located at the upper ends of the bars, the pole pieces 23 and 24 will be north poles, and the pole pieces 25 and 26 will be south poles. The outer faces of the vertically extending legs of each pair of pole pieces are disposed in the same vertical plane.

The field structure F is suspended from the top plate A by means of the previously described screws 3, the lower ends of which are screwed into threaded holes 27 provided in the upper backstrap 21 adjacent the opposite ends thereof, as shown in Fig. 2. The field structure is also suspended from the top plate by means of a screw 28 which extends downwardly through a clearance hole in the top plate, and is screwed into a threaded hole formed in a supporting strap 29 which is bolted to the upper side of the backstrap 21 near the center thereof as best seen in Fig. 3. It will be seen, therefore, that the field structure is securely held in place against the underside of the top plate.

Attached to the lower backstrap 22 between the pole pieces 25 and 26 by means of screws 30 is a non-magnetizable bracket 31. This bracket is substantially U-shaped, and the upwardly extending arms 31ᵃ and 31ᵇ thereof are provided in their upper ends with aligned knife-edge bearings 32 and 33, respectively, in which the rotor R referred to hereinbefore is journalled, as best seen in Fig. 3. The bearings 32 and 33 may be of any suitable construction, but as here shown, these bearings are similar in all respects to those described and claimed in U. S. Patent No. 2,069,908, dated Feb. 9, 1937, issued to W. B. Wells, for Bearings and method of manufacturing the same.

Referring now also to Fig. 6, the rotor R, in the form here shown, comprises a core 35 of suitable magnetizable material, such as silicon steel, provided adjacent its ends with shoulders against which downwardly extending armatures 36 and 37 are clamped by means of nuts 38 and 39, respectively. End pins 40 of suitable material, such as hardened steel, are inserted in the ends of the core 35, and these end pins are mounted to rotate in the knife-edge bearings previously described. The armature 36 is adapted to cooperate with the pole pieces 24 and 25, and is spaced from the outer faces of the vertical legs of these pole pieces, by vertical air gaps, as will be seen from an inspection of Fig. 3. The armature 37 is likewise adapted to cooperate with the pole pieces 23 and 26, and is spaced from the outer faces of the vertical legs of these pole pieces by vertical air gaps. The armatures 36 and 37 are of magnetizable material, and are provided with ears 36ᵃ, 36ᵇ, 37ᵃ, and 37ᵇ, which ears taper from the center of the armatures as shown for reasons which will be explained hereinafter.

Clamped between the armature 36 and the nut 38 is a triangular plate 41, and attached to the outer side of this plate on opposite sides of the core 35 of the rotor R, as best seen in Figs. 3, 4, and 6, are two studs 42ᵃ and 42ᵇ, which carry rollers 43ᵃ and 43ᵇ, respectively. A supporting bracket 44 is removably secured to the arm 31ᵃ of the U-shaped bracket 31 by means of machine screws 45, and pivotally supported at one end on pivot pins 46ᵃ and 46ᵇ mounted in bifurcated ears 47ᵃ and 47ᵇ, respectively, which are provided on the bracket 44, are two operating arms 48ᵃ and 48ᵇ, the free ends of which extend toward, and cooperate with, the rollers 43ᵃ and 43ᵇ, respectively. A counterweight arm 49ᵃ is pivotally supported intermediate its ends on the operating arm 48ᵃ by means of a pivot pin 50ᵃ mounted in pin supports 51ᵃ secured to the operating arm, and a counterweight arm 49ᵇ is similarly pivotally supported intermediate its ends on the operating arm 48ᵇ by means of a pivot pin 50ᵇ mounted in pin supports 51ᵇ secured to this latter operating arm. The counterweight arm 49ᵃ carries a counterweight 52ᵃ which constantly biases this counterweight arm to a position in which the inner end thereof engages the upper side of the operating arm 48ᵃ adjacent its inner end, and the counterweight 52ᵃ and counterweight arm 49ᵃ together bias the operating arm 48ᵃ to a position in which a downwardly extending projection 57ᵃ which is formed on the operating arm engages the inner end of an adjustable stop screw 53ᵃ that is screwed through the lower portion of the ear 47ᵃ of the supporting bracket 44. The counterweight arm 49ᵇ similarly carries a counterweight 52ᵇ which constantly biases this counterweight arm to a position in which the inner end thereof engages the upper side of the operating arm 48ᵇ, and the counterweight 52ᵇ and counterweight arm 49ᵇ together bias the operating arm 48ᵇ to a position in which a downwardly extending projection 57ᵇ which is formed on the operating arm engages the inner end of an adjustable stop screw 53ᵇ that is screwed through the lower portion of the ear 47$^b$ of the supporting bracket 44. The stop screws 53$^a$ and 53$^b$ are provided with lock nuts 58$^a$ and 58$^b$ for locking the stop screws in their adjusted positions. The outer end of the operating arm 48$^a$ is provided with an upstanding lug 54$^a$ which cooperates with the outer end of the counterweight arm 49$^a$ to limit the amount of rotation of the counterweight arm 49$^a$ relative to the operating arm 48$^a$, and the outer end of the operating arm 48$^b$ is similarly provided with an upstanding lug 54$^b$ which cooperates with the outer end of the counterweight arm 49$^b$ to limit the rotation of this counterweight arm relative to the operating arm 48$^b$. The counterweight 52$^a$ is slotted in its underside at 55$^a$ (see Fig. 7) to receive the counterweight arm, and is adapted to be fastened in an adjusted longitudinal position on the arm by means of a set screw 56$^a$ which is screwed through the weight at one side of the slot for engagement with the arm. The set screw 56$^a$ carries a lock nut 59$^a$ by means of which the set screw is prevented from becoming unscrewed. The counterweight 52$^b$ is similar in construction to the counterweight 52$^a$, and is secured to the associated counterweight arm 49$^b$ in the same manner that the counterweight 52$^a$ is secured to the counterweight arm 49$^a$. The operating arms 48$^a$ and 48$^b$ normally both rest on the associated rollers 43$^a$ and 43$^b$, and the stop screws 53$^a$ and 53$^b$ are so adjusted that when the operating arms are both engaging the associated rollers, and the downwardly extending projections 57$^a$ and 57$^b$ are each engaging the associated stop screws 53$^a$ and 53$^b$, the rotor R will occupy its proper normal position. It will be seen, therefore, that if the rotor R is rotated from its normal position in a clockwise direction, as viewed in Fig. 4, the operating arm 48$^a$ will be raised, but that, if the rotor is rotated from its normal position in the opposite or counter-clockwise direction, the operating arm 48$^b$ will then be raised, thereby providing means whereby the rotor is biased to a middle or normal position in which the longer axes of the armatures 36 and 37 are substantially vertical. It will also be seen that the weight of the operating arms 48$^a$ and 48$^b$ assists in biasing the rotor to its normal position. The reasons for providing the auxiliary counterweight arms 49$^a$ and 49$^b$, and for loosely pivoting these counterweight arms on the operating arms in the manner described, will be made clear hereinafter.

It should be pointed out that the pivot pins 46$^a$ and 46$^b$ about which the operating arms 48$^a$ and 48$^b$ rotate are located in such positions with respect to the points at which the rollers 43$^a$ and 43$^b$ engage the operating arms, and the parts are so proportioned, that when an arm is being lifted by a roller, the point of contact between the arm and the roller will move outwardly along the arm, and around the roller in a counter-clockwise direction for the roller 43$^a$, and in a clockwise direction for the roller 43$^b$, so that there is substantially no sliding motion between the rollers and the arms.

The operating arms 48$^a$ and 48$^b$, in addition to serving as a part of the means for biasing the rotor R to its normal position, are arranged to operate separate contact mechanisms. These contact mechanisms are similar, and their corresponding parts are designated by the same reference characters with the distinguishing exponents $a$ and $b$, respectively, so that an understanding of both will be had from a description of only one. Referring particularly to the contact mechanism controlled by the operating arm 48$^a$, for example, this contact mechanism comprises a plurality of flexible contact fingers 60$^a$, 61$^a$, and 62$^a$ secured by means of an insulating support 63$^a$ to a depending leg 64$^a$ forming part of a rocker 65$^a$. The rocker 65$^a$ is pivotally supported on horizontally aligned trunnion screws 66$^a$ mounted in upstanding arms 67$^a$ formed on one end of the bracket 44, and is provided with a laterally extending arm 68$^a$ which projects toward the operating arm 48$^a$. The free end 69$^a$ of the arm 68$^a$ is bent at right angles to the remainder of the arm, and overlies a laterally projecting pin 70$^a$ secured to the operating arm 48$^a$. The rocker is biased by gravity to rotate in a clockwise direction, as viewed in Fig. 4, to such a position that the arm 68$^a$ is constantly held in engagement with the pin 70$^a$, and it will be seen, therefore, that the rocker 65$^a$ assists in biasing the rotor to its normal position. It will also be seen that when the rotor is rotated away from its normal position in a clockwise direction, as viewed in Fig. 4, the resultant rotation of the operating arm 48$^a$ will act through the pin 70$^a$ and arm 68$^a$ to rotate the rocker in opposition to its bias. The extreme position to which the rocker is free to rotate in opposition to its bias is limited by an adjustable stop screw 71$^a$ which is screwed through a depending lug 72$^a$ formed on the underside of the bracket 44, and which screw cooperates with the lower end of the depending leg 64$^a$, and it follows that by adjusting the stop screw 71$^a$, the extreme position to which the rotor is free to rotate in a clockwise direction, as viewed in Fig. 4, may be limited. Mounted on the stop screw 71$^a$ is a lock nut 73$^a$ which serves to lock the stop screw in an adjusted position. For convenience in describing the remainder of the signal, we shall hereinafter refer to the position which the rocker occupies when the rotor occupies its normal position as the normal position of the rocker, and the position which the rocker occupies when the leg 64$^a$ is engaging the stop screw 71$^a$ as the operated position of the rocker. When the rocker occupies its normal position, the contact fingers 60$^a$ and 62$^a$ engage fixed contact members 74$^a$ and 76$^a$ secured to terminal posts 77$^a$ and 79$^a$ mounted on the top plate A, to close back contacts 60$^a$—74$^a$ and 62$^a$—76$^a$. When, however, the rocker is rotated to its operated position, the contact fingers 60$^a$ and 62$^a$ then move out of engagement with the fixed contact members 74$^a$ and 76$^a$ to open the contacts 60$^a$—74$^a$ and 62$^a$—76$^a$, and the contact finger 61$^a$ moves into engagement with a fixed contact member 75$^a$ secured to a terminal post 78$^a$ mounted on top plate A, to close a front contact 61$^a$—75$^a$. To facilitate making electrical connections with the contact fingers 60$^a$, 61$^a$, and 62$^a$, these contact fingers are connected by means of flexible connectors 80$^a$, 81$^a$, and 82$^a$ with terminal posts 83$^a$, 84$^a$, and 85$^a$, respectively, mounted on the top plate A.

The lower end of the previously described spectacle arm 12 is in the form of a flat punching, and is secured to the armature 37 of the rotor R in such manner that when the rotor occupies its normal position, the filter 14 carried by the spectacle arm will be in axial alignment with the windows 10. The parts are so adjusted and so proportioned that if the rotor is rotated in the clockwise direction, as viewed in Fig. 4, to the position in which the leg 64$^a$ of the rocker 65$^a$ is engaging the stop screw 71$^a$, the filter 13 will then be in axial alignment with the windows 10.

and that, if the rotor is rotated in a counterclockwise direction, as viewed in Fig. 4, to the position in which the leg 64$^b$ of the rocker 65$^b$ is engaging the stop screw 71$^b$, the filter 15 will then be located in axial alignment with the windows 10.

Figures 7, 8, 9, 10:
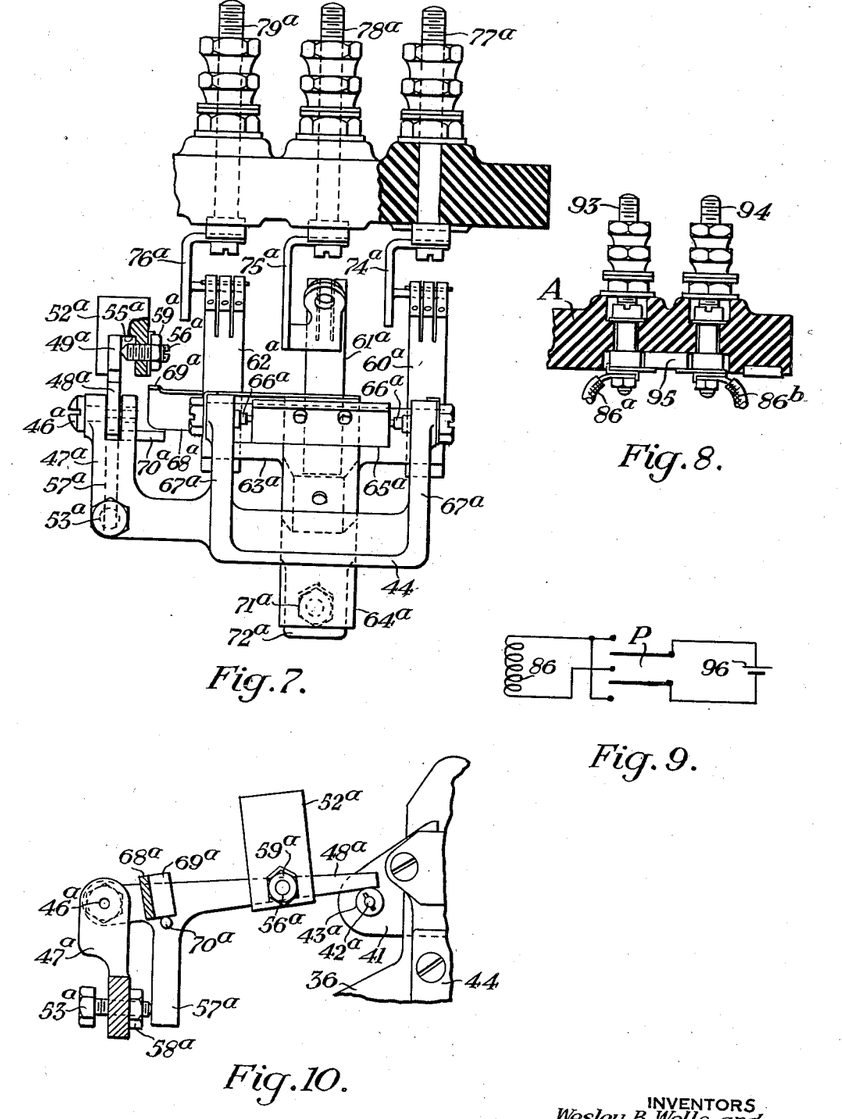
Fig. 7 is a detail view, showing on an enlarged scale, a portion of the operating mechanism for the signal illustrated in Figs. 1 to 4, inclusive.
Fig. 8 is a detail sectional view taken on the line VIII—VIII of Fig. 1.
Fig. 9 is a diagrammatic view showing operating circuits for the mechanism.
Fig. 10 is a detail view showing a modification of a portion of the mechanism shown in Figs. 2, 3, and 4.

Surrounding the core 35 of rotor R is a rotor coil 86 which, in the form here shown, comprises the usual helix of insulating wire wound by means of an automatic machine on a tube of insulation 87, which surrounds a heavy sleeve 88 of suitable conducting material, such as copper, between insulating end plates 89 and 90 that are held in place on the sleeve by spinning over the ends of the sleeve. In constructing the coil 86, the insulation is placed on the copper sleeve before the winding is applied, and after the winding has been applied, the end plates are then slipped over the protruding ends of the copper sleeve and are then fastened in place. It will be noted that the tube of insulation extends beyond the winding and fits into annular recesses formed in the insulating end plates, which construction greatly increases the insulation break-down voltage between the winding and the copper sleeve. The coil is supported between the backstraps 21 and 22 by means of two brackets 91 which are fastened, as by riveting, to the backstrap. The brackets 91 extend longitudinally at the top and bottom of the coil, and fit into suitable slots 92 formed in the end plates 89 and 90. The ends of the brackets 91 are bent over to form lugs 91$^a$ which engage the end plates to hold the coil in the proper longitudinal position with respect to the core. The leads 86$^a$ and 86$^b$ of the coil 86 are secured to terminal posts 93 and 94 mounted on the top plate A, as shown in Fig. 8. The lower ends of the terminal posts 93 and 94 are shunted by a carborundum lightning arrester 95 of standard construction.

It is desirable that the clearance between the core 35 and the coil 86 should be as small as possible, but since the core 35 is mounted to rotate within the coil, it is essential that the core and coil do not touch each other. It will be apparent, therefore, that the core 35 should be accurately centered with respect to the coil 86. To facilitate this centering, we preferably construct the brackets 91 of suitable material such as brass, which may be bent sufficiently to permit the necessary vertical adjustment of the coil, and we so proportion the brackets that, after they have been bent, they will not permit motion of the coil due to vibration or jarring of the signal. Furthermore, we construct the holes in the brackets 91 through which the screws 30, which fasten this bracket to the backstrap 22, pass, with sufficient clearance so that this backstrap, and hence the core 35 of the rotor R carried thereby, may be moved at right angles to the axis of the coil in the horizontal plane. It follows that with adjustments between the core and coil in both planes, the core can be conveniently and accurately centered with respect to the coil.

The rotor coil 86 is intended to be reversibly supplied with current, and for this purpose we have shown in Fig. 9 a battery 96 which is connected with this coil over a pole changer P. As here shown, the pole changer P is manually operated, but in actual practice this pole changer will usually be replaced by pole-changing contacts of a relay, or by the contacts of other signals which are similar to the signals here shown.

In addition to the terminal posts previously referred to, the top plate A also carries two additional terminal posts 97 and 98 which serve as connections for the lamp of the optical unit which cooperates with the signal mechanism.

The signal as a whole is intended to be mounted within an outer housing which contains means for projecting a light beam through the windows 10 and the aligned filter, and to facilitate securing the signal within this housing, a transversely extending strap 99 is secured to the upper side of the top plate A by means of screws 100 which extend downwardly through clearance holes in the strap 99, and are screwed into threaded inserts molded in the top plate. The strap 99 is provided adjacent each end with upstanding apertured lugs 101 for the reception of supporting bolts, and the top plate A is provided in its forward end with a tubular insert 102 for the reception of a projecting pin which is provided in the outer housing. An outer housing of the type in which the signal is intended to be mounted and the means for mounting the signal within this housing including a pair of supporting bolts which cooperate with the lugs 101 and a projecting pin which cooperates with the tubular insert 102 are shown in Letters Patent of the United States No. 2,111,650, granted to us on March 22, 1938, for Light signals, and if a fuller description of the mounting means is desired reference may be had to this patent.

The strap 99 is also provided with holes for the reception of the lower ends of an inverted U-shaped bolt 103 which bolt serves as a handle to facilitate carrying the signal and mounting it in the outer housing.

The operating mechanism is enclosed within a glass cover 104 held in place by means of a U-shaped strap 105. This strap surrounds the cover near the center thereof, and is provided at its upper ends with inwardly extending ears 106 which project into recesses 107 formed in the opposite sides of the top plate A. The ears 106 are each provided with a hole 108 which aligns with a hole 109 provided in the supporting strap 99, and have secured to their undersides as by riveting strengthening plates 110 provided with threaded holes 111 which align with the holes 108 and 109. A screw 112 extends downwardly through each pair of aligned holes 109 and 108 and is screwed at its lower end into the associated threaded hole 111. The parts are so proportioned that when the screws 112 are tightened, the strap 105 and screws assist in fastening the strap 99 to the top plate A. The strap 105 assists in supporting the weight of the signal when the signal is supported by means of lugs 101 or the handle 103.

Assuming for purposes of explanation that the magnets M$^1$ and M$^2$ are so disposed that the pole pieces 23 and 24 become north poles and the pole pieces 25 and 26 become south poles, the operation of the relay as a whole is as follows: When pole changer P occupies its middle position in which no current is supplied to coil 86, as shown in the drawings, the only flux which threads the armatures 36 and 37 is the flux from the associated pole pieces 24, 26, and 23, 25, and the armatures are so shaped, and the parts are so proportioned that this flux will exert no appreciable torque on the rotor. The rotor is therefore held in its normal position by the biasing means described hereinbefore. When the rotor occupies this position, the filter 14 is located in axial alignment with the windows 10, and the beam projected by the signal will therefore be red. Furthermore, the back contacts 60$^a$—74$^a$, 62$^a$—76$^a$, 60$^b$—74$^b$, and 62ᵇ—76ᵇ are then closed, while the contacts 61ᵃ—75ᵃ and 61ᵇ—75ᵇ are both open.

If, now, pole changer P is thrown in such a direction that winding 86 is supplied with current of normal polarity, armature 36 becomes a north pole and armature 37 becomes a south pole. Under these conditions, the pole piece 24, being a north pole, repels the armature 36, and the pole piece 25, being a south pole, attracts the armature 36; while the pole piece 23, being a north pole, attracts the armature 37, and the pole piece 26, being a south pole, repels the armature 37. A torque is therefore exerted on rotor R which rotates the rotor in a counter-clockwise direction, as viewed in Fig. 4. This rotation of the rotor raises the operating arm 48ᵇ to its upper position and rotates the rocker 65ᵇ to its operated position, thereby opening the contacts 60ᵇ—74ᵇ and 62ᵇ—76ᵇ and closing the contact 61ᵇ—75ᵇ. This rotation of the rotor also brings the filter 15 into axial alignment with the windows 10, so that the beam projected by the signal will then be colored green. The counter-clockwise rotation of the rotor, however, does not affect the operating arm 48ᵃ, so that contacts 60ᵃ—74ᵃ and 62ᵃ—76ᵃ remain closed and front contact 61ᵃ—75ᵃ remains open. The rotor will now remain in the position in which the filter 15 is located in axial alignment with the windows 10 until pole changer P is operated to deenergize coil 86, at which time the rotor will be returned to its normal position by the biasing means associated with the operating arm 48ᵇ.

If pole changer P is thrown in such a direction that coil 86 is supplied with current of reverse polarity, armature 36 becomes a south pole and armature 37 becomes a north pole. Under these conditions, armature 36 is attracted by pole piece 24 and repelled by pole piece 25, while armature 37 is repelled by pole piece 23 and is attracted by pole piece 26, so that a torque is exerted on rotor R which rotates the rotor in a clockwise direction as viewed in Fig. 4. This rotation raises operating arm 48ᵃ to its upper position, thereby operating rocker 65ᵃ to open contacts 60ᵃ—74ᵃ and 62ᵃ—76ᵃ and to close contact 61ᵃ—75ᵃ. This rotation also brings filter 13 into axial alignment with the windows 10, so that the beam projected by the signal will then be yellow. During this rotation, operating arm 48ᵇ remains in the position shown, so that back contacts 60ᵇ—74ᵇ and 62ᵇ—76ᵇ remain closed, and front contact 61ᵇ—75ᵇ remains open. When pole changer P is operated to deenergize coil 86, the armature will then return to its normal position due to the biasing means associated with the operating arm 48ᵃ.

It should be particularly pointed out that since the coil 86 is slow acting, the flux which is set up in the rotor R when this coil is energized builds up slowly, and the magnetic torque exerted on the rotor due to this flux, increases slowly, so that the rotor moves slowly from its normal position to either of its operated positions. This slow operation of the rotor minimizes the momentum acquired by the rotor, and hence, reduces the tendency of the rotor to rebound when the rotation of the rotor is stopped by the leg 64 of the rocker which is operated by the rotor engaging the associated stop screw 71, thereby materially improving the operation of the signal. Furthermore, due to the fact that the armatures 36 and 37 are mounted in depending vertical positions in the manner shown, the use of counterweights for biasing the rotor to its normal position has been rendered unnecessary, thus permitting the weight, and hence the inertia, of the rotor to be reduced, thereby further minimizing the tendency of the rotor to rebound. In addition, the counterweight assembly previously described permits each counterweight and counterweight arm to overtravel until the arm strikes the associated stop 54 on the operating arm, thus still further reducing the tendency of the rotor to rebound. It should also be noted that since the coil 86 is slow acting, the decay of the flux in the rotor upon the deenergization of the coil is also retarded, thereby causing the magnetic torque exerted on the rotor by this flux to decrease slowly, with the result that the rotor returns slowly to its normal position. By slowing up the motion of the rotor while returning to its normal position in this manner, the tendency of the armatures to overtravel and rock the rotor in its normal position due to the momentum acquired by the rotating parts is almost entirely eliminated. It will also be apparent that the use of the slow-acting coil also retards the decay and build-up of the magnetic flux of the rotor when the polarity of the current supplied to the coil 86 is reversed, thus slowing up the motion of the rotor when going from one operated position to the other and hence reducing the tendency of the rotor to rebound under these conditions.

It should be pointed out, further, that since the armatures 36 and 37 are formed with tapered ears as previously described, a greater torque is exerted on the rotor near the end of its stroke in either direction than at the beginning, this added torque being desirable for compressing the front contacts of the signal.

If desired the counterweight arms 49ᵃ and 49ᵇ may be eliminated and the counterweights mounted directly on the operating arms 48ᵃ and 48ᵇ, as shown in connection with the operating arm 48ᵃ in Fig. 10. The operation of the signal when constructed in this manner is essentially the same as that previously described.

One advantage of a signal embodying our invention is that since all parts are mounted on an insulating top plate, the possibility of lightning jumping from the coil 86 to the rotor and field structure, and hence to ground through the signal housing and supporting mast is greatly reduced. Furthermore, the particular construction of the operating coil 86 further reduces this possibility as pointed out hereinbefore.

Another advantage of a signal embodying our invention is that since the operating unit does not carry the light unit and lens assembly, the manufacture and handling of the signal is greatly simplified. Furthermore, the operating temperature of the operating mechanism is greatly reduced.

Another advantage of a signal embodying our invention is that the rotor is biased to return to its normal position even if the contact carrying rockers should stick in either of their operated positions, thus insuring that the signal will display the proper color indication independently of the position of the contacts of the contact mechanism.

A further advantage of a signal embodying our invention is that since the contact fingers are mounted in substantially vertical positions the tendency of dirt to remain on the contact surfaces is greatly decreased.

A further advantage of a signal embodying our invention is that it provides more contacts than has heretofore been provided, and greatly facilitates inspection of the contacts.

A further advantage of a signal embodying our invention is that the various stop screws for limiting the movement of the rotor and contact mechanisms are located in positions where they are readily accessible.

A still further advantage of a signal embodying our inventtion is that the contact assembly and counterweight assembly may be removed as a whole from the signal for inspection or repair merely by removing the screws 45 which fasten the bracket 44 to the bracket 31.

Although we have herein shown and described only one form of signal mechanisms embodying our invention, it is understood that various changes and modifications may be made therein within the scope of the appended claims without departing from the spirit and scope of our invention.

Having thus described our invention, what we claim is:

1. A light signal comprising an insulating top plate having signal operating mechanism secured to the underside thereof, a strap secured to the upper side of said top plate, a cover enclosing said operating mechanism secured to the underside of said top plate by means which is fastened to the opposite ends of said strap, and an inverted U-shaped bolt secured at its lower end to said strap adjacent its ends and serving as a handle to facilitate handling of said signal.

2. A light signal comprising an insulating top plate having signal operating mechanism secured to the underside thereof, a strap secured to the upper side of said top plate and provided adjacent each end with upwardly extending apertured ears for the reception of fastening devices for securing the signal to a support, and a socket formed in one end of said top plate at a point between said ears for receiving a pin carried by the support to assist in positioning said signal with respect to the support.

3. A light signal comprising an insulating top plate having signal operating mechanism secured to the underside thereof, a first strap secured to the upper side of said top plate and extending transversely thereof, a glass cover enclosing the operating mechanism, and a second strap embracing the bottom and two sides of said cover and secured at its upper ends to the opposite ends of said first strap for securing said cover to said top plate.

4. A light signal comprising an insulating top plate having signal operating mechanism secured to the underside thereof, a first strap secured to the upperside of said top plate and provided adjacent each end with a hole, a recess formed in each side of said top plate directly below one of said holes in said first strap, a glass cover enclosing said operating mechanism and engaging the underside of said top plate, a U-shaped strap surrounding said cover near the center thereof and provided at its upper ends with ears one of which projects into each of said recesses and has formed therein a hole which aligns with the adjacent hole in said first strap, a plate secured to each ear and provided with a tapped hole which aligns with the hole in the associated ear, and a screw extending through each hole in said first strap, the aligned hole in the adjacent ear of said second strap and screwed into the tapped hole in the associated plate, whereby said cover is secured to the underside of said top plate by means of said two straps and said screws.

5. A light signal comprising an insulating top plate, an operating mechanism secured to the underside of said top plate, a first strap extending across the upper side of said top plate and provided adjacent each end with a hole, a recess formed in each side of said top plate directly below one of said holes in said first strap, a glass cover enclosing said operating mechanism and engaging the underside of said top plate, a U-shaped strap embracing the bottom and sides of said cover near the center thereof and provided at its upper ends with ears one of which projects into each of said recesses and has formed therein a hole which aligns with the adjacent hole in said first strap, a plate secured to each ear and provided with a tapped hole which aligns with the hole in the associated ear, and a screw extending through each hole in said first strap, the aligned hole in the adjacent ear of said second strap and screwed into the tapped hole in the associated plate, whereby said cover is secured to the underside of said top plate by means of said two straps and said screws.

WESLEY B. WELLS.
WILLIAM K. LOCKHART.